United States Patent Office 3,809,701
Patented May 7, 1974

3,809,701
TRIAZOLYLPHOSPHONIC AND -PHOSPHORIC
ESTERS
Dag Dawes, Pratteln, and Beat Boehner, Binningen, Switzerland, assignors to Ciba-Geigy Corporation, Ardsley, N.Y.
No Drawing. Filed Jan. 12, 1972, Ser. No. 217,251
Claims priority, application Switzerland, Jan. 19, 1971, 774/71; Dec. 7, 1971, 17,788/71
Int. Cl. C07d 55/06
U.S. Cl. 260—308 R          17 Claims

ABSTRACT OF THE DISCLOSURE

Triazolylphosphonic and -phosphoric esters of the formula

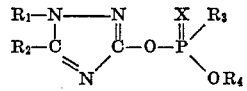

wherein $R_1$ and $R_4$ represent similar or different radicals such as hydrogen, alkyl, unsubstituted or substituted phenyl or cycloalkyl, $R_2$ represents the groups —$COOR_1$, —CO—$N(R_4)(R_5)$ or —CN, $R_3$ represents alkyl, alkoxy or phenyl, $R_5$ represents hydrogen or alkyl and X represents oxygen or sulphur their manufacture and their use in pest control are disclosed.

---

The present invention relates to triazolylphosphonic and -phosphoric esters, their manufacture and their use in pest control.

The triazolylphosphonic and -phosphoric esters correspond to the formula

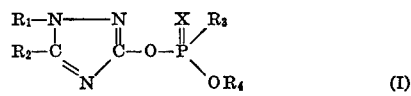   (I)

wherein $R_1$ and $R_4$ represent similar or different radicals such as hydrogen, alkyl, unsubstituted or substituted phenyl or cycloalkyl, $R_2$ represents the groups —$COOR_1$, —CO—$N(R_4)(R_5)$ or —CN, $R_3$ represents alkyl, alkoxy or phenyl, $R_5$ represents hydrogen or alkyl and X represents oxygen or sulphur.

The alkyl chains which are possible for $R_1$, $R_3$ and $R_4$ contain 1 to 18, but preferably 1 to 4, carbon atoms. These radicals may be branched or straight-chain, unsubstituted or substituted. Examples of such radicals include methyl, trifluoromethyl, ethyl, cyanoethyl, propyl, isopropyl, n-, i-, sec.-, tert.butyl.

The cycloalkyl radicals representing $R_1$ have 3 to 7, preferably 5 or 6, ring members. The phenyl radical which $R_1$ may represent may be unsubstituted or substituted.

The substituents at the alkyl and phenyl radicals may be of the first or second order. By substituents of the first order are meant here electron donors that increase the basicity. Suitable groups include the following: halogen atoms, such as fluorine, chlorine, bromine or iodine; alkoxy and alkylthio groups containing 1 to 4 carbon atoms and which may be branched or unbranched, but are preferably unbranched and contain 1 to 2 carbon atoms; lower alkoxyalkyl and alkyl groups, to which the above definitions also apply; primary, secondary and tertiary amino groups, preferred substituents being alkyl and alkanol groups; hydroxyl and mercapto groups. The phenyl radical may also be substituted by alkyl, mono- and dihalogenoalkyl groups.

By substituents of the second order are meant acidifying electron acceptors. Suitable groups include the following: nitro and cyano groups; trihalogenoalkyl groups, wherein halogen preferably represents fluorine or chlorine; lower alkylsulphinyl, lower alkylsulphonyl groups, which contain a branched or unbranched alkyl radical with 1 to 4, preferably an unbranched alkyl radical containing 1 or 2 carbon atoms; sulphamyl and sulphamido groups, it being possible for the amino groups to carry one or two substituents, preferably lower alkyl groups, as defined hereinabove.

Particular importance attaches to compounds of the formula

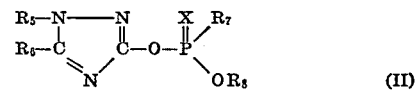   (II)

wherein $R_5$ represents $C_1$–$C_4$ alkyl, phenyl or chlorophenyl, $R_6$ represents the groups —$COOCH_3$,

—$COOH_2H_5$,

—$CONH_2$, —$CONHCH_3$ or —$CON(CH_3)_2$, $R_7$ represents methyl, ethyl, methoxy or ethoxy, $R_8$ represents methyl or ethyl, n-propyl and X represents oxygen or sulphur.

The compounds of the Formula I are manufactured according to the invention by (a) Reacting a hydroxytriazole of the formula

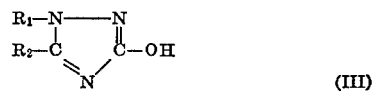   (III)

with a phosphoric halide of the formula

   (IV)

in the presence of an acid binding agent or (b) Reacting a salt of a hydroxytriazole of the Formula III with a phosphoric halide of the Formula IV. In the Formulae III and IV the symbols $R_1$ to $R_4$ and X have the meanings as given for the Formula I. Hal represents fluorine, chlorine, bromine or iodine, but especially chlorine or bromine.

As salts of hydroxy-triazoles of the Formula II which are suitable for the process according to the invention there may be used, for example, salts of monovalent metals, in particular the alkali metal salts.

As acid binding agents the following bases may for example be used: tertiary amines, such as triethylamine, dimethyl aniline, pyridine bases, inorganic bases, for example hydroxides and carbonates of alkali and alkaline earth metals, preferably sodium and potassium carbonate.

The reactions may be carried out preferably in solvents or diluents which are inert towards the reactants. The following, for example, are suitable for this purpose: aromatic hydrocarbons, such as benzene, toluene, gasolines, halogenated hydrocarbons, chlorobenzene, polychlorobenzenes, bromobenzene, chlorinated alkanes containing 1 to 3 carbon atoms, ethers, such as dioxan, tetrahydrofuran; esters, for example ethyl acetate; ketones, for example methyl ethyl ketone, diethyl ketone.

The starting materials of the Formula III are new compounds which may be manufactured according to methods which are known per se. These compounds are obtained for example by reacting a correspondingly substituted semicarbazide with an ortho-carboxylic acid ester of the general formula

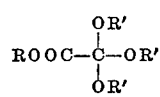

(R, R'=alkyl).

The corresponding carboxylic acid amides and nitriles are obtained by means of known secondary reactions.

The following compounds of the Formula III, for example, are manufactured analogously to the above cited reactions:

| Structure | M.P. |
|---|---|
| Ph-N—N, H₅C₂O—CO—C(N)—OH | 208–210° C. |
| Ph-N—N, H₂N—CO—C(N)—OH | 219–221° C. |
| Ph-N—N, H₃C—NH—CO—C(N)—OH | 240–243° C. |
| Ph-N—N, (H₃C)₂N—CO—C(N)—OH | 182–185° C. |
| (o-Cl)Ph-N—N, H₅C₂O—CO—C(N)—OH | 207–209° C. |
| Ph-N—N, H₅CO—CO—C(N)—OH | 210–215° C. |
| CH₃-CH(CH₃)-N—N, H₅C₂O—CO—C(N)—OH | 192–193° C. |

The compounds of the Formula I have a broad biocidal activity spectrum and may be used to combat diverse vegetable and animal pests, for example as bactericides, viricides, selective herbicides, molluscicides and anthelminthics.

In particular, the compounds of the Formula I possess insecticidal and acaricidal properties and may be used against all development stages such, for example, as eggs, larvae, pupae, nymphs and adults of insects and representatives of the order Acarina, for example against insects of the families: Teltigonidae, Gryllidae, Gryllotalpidae, Blattidae, Peduviidae, Phyrrhocoriae, Tenebrionidae, Chrysomelidae, Bruchidae, Tineidae, Noctindae, Lymatriidae, Cimicidae, Delphacidae, Aphididae, Diaspididae, Pseudococcidae, Scarbaeidae, Dermestidae, Coccinellidae, Pyralidae, Culicidae, Tipulidae, Stomoxydae, Trypetidae, Muscidae, Galliphoridae, and Publicidae. Acarida of the families: Ixodidae, Argasidae, Tetranychidae, and Dermanyssidae.

The insecticidal or acaricidal action can be substantially broadened and adapted to the particular circumstances by the addition of other insecticides and/or acaricides.

Suitable additives include, for example, the following active substances:

Bis-O,O-diethylphosphoric acid anhydride (TEPP)
Dimethyl-2,2,2-trichloro-1-hydroxyethyl)-phosphonate (Trichlorfon)
1,2-dibromo-2,2-dichloroethyldimethylphosphate (Naled)
2,2-dichlorovinyldimethylphosphate (Dichlorvos)
2-methoxycarbamyl-1-methylvinyldimethylphosphate (Mevinphos)
Dimethyl-1-methyl-2-(methylcarbamoyl)-vinylphosphate cis (Monogrothophos)
3-(dimethoxyphosphinyloxy)-N,N-dimethyl-cis-crotonamide (Digrotophos)
2-chloro-2-diethylcarbamoyl-1-methylvinylidimethylphosphate (Phosphamidon)
O,O-diethyl-O(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-ethylthio)ethyldithiophosphate (Disulfoton)
O,O-dimethyl-S-2-(ethylsulphinyl)ethylthiophosphate (Oxydemetonmethyl)
O,O-dimethyl-S-(1,2-dicarboethoxyethyldithiophosphate (Malathion)
O,O,O,O-tetraethyl-S,S'-methylene-bis-dithiophosphate (Ethion)
O-ethyl-S,S-dipropylidithiophosphate
O,O-dimethyl-S-(N-methyl-N-formylcarbamoylmethyl)-dithiophosphate (Formothion)
O,O-dimethyl-S-(N-methylcarbamoylmethyl)dithiophosphate (Dimethoate)
O,O-dimethyl-O-p-nitrophenylthiophosphate (Parathionmethyl)
O,O-diethyl-O-p-nitrophenylthiophosphate (Parathion)
O-ethyl-O-p-nitrophenylphenylthiophosphate (EPN)
O,O-dimethyl-O-(4-nitro-m-tolyl)thiophosphate (Fenitrothion)
O,O-dimethyl-O-2,4-5-trichlorphenylthiophosphate (Ronnel)
O-ethyl-O,2,4,5-trichlorphenylethylthiophosphate (Trichloronate)
O,O-dimethyl-O-2,5-dichlor-4-bromphenylthiophosphate (Bromophos)
O,O-dimethyl-O-(2,5-dichlor-4-jodphenyl)-thiophosphate (Jodofenphos)
4-tert.butyl-2-chlorphenyl-N-methyl-O-methylamidophosphate (Grufomate)
O,O-dimethyl-O-(3-methyl-4-methylmercaptophenyl) thiophosphate (Fenthion)
Isopropylamino-O-ethyl-O-(4-methylmercapto-3-methylphenyl)-phosphate
O,O-diethyl-O-p-(methylsulphinyl)phenyl-thiophospate (Fensulfothion)
O-p-(dimethylsulfamido)phenyl O,O-dimethylthiophosphate (Famphur)
O,O,O',O'-tetramethyl-O,O'-thiodi-p-phenylenthiophosphate
O-ethyl-S-phenyl-ethyldithiophosphate
O,O-dimethyl-O-(α-methylbenzyl-3-hydroxycotonyl) phosphate
2-chlor-1-(2,4-dichlorphenyl)vinyl-diethylphosphate (Chlorfenvinphos)
2-chlor-1-(2,4,5-trichlorphenyl)vinyl-dimethylphosphate
O-[2-chlor-1-(2,5-dichlorphenyl)]vinyl-O,O-diethylthiophosphate
Phenylglyoxylonitriloxim-O,O-diethylthiophosphate (Phoxim)
O,O-diethyl-O-(3-chlor-4-methyl-2-oxo-2-H-1-benzopyran-7-yl)-thiophosphate (Coumaphos)
2,3-p-dioxandithio-S,S-bis(O,O-diethyldithiophosphate (Dioxathion)
5-[(6-chlor-2-oxo-3-benzoxazolinyl)methyl]O,O-diethyldtihiophosphate (Phosalone)
2-(diethoxyphosphinylimino)-1,3-dithiolane
O,O-dimethyl-S-[2-methoxy-1,3,4-thiadiazol-5-(4H)-onyl-(4)-methyl]dithiophosphate
O,O-dimethyl-S-phthalimidomethyl-dithiophosphate (Imidan)
O,O-diethyl-O-(3,5,6-trichlor-2-pyridyl)thiophosphate
O,O-diethyl-O-2-pyrazinylthiophosphate (Thionazin)
O,O-diethyl-O-(2-isopropyl-4-methyl-6-pyrimidyl)thiophosphate (Diazinon)

O,O-diethyl-O-(2-chimoxalyl)thiophosphate
O,O-dimethyl-S-(4-oxo-1,2,3-benzotriazin-3(4H)-yl-methyl)dithiophosphate (Azinphosmethyl)
O,O-diethyl-S-(4-oxo-1,2,3-benzotriazin-3(4H)-yl-methyl)dithiophosphate (Azinphosethyl)
S-[(4,6-diamino-s-triazin-2-yl)methyl]-O,O-dimethyl-dithiophosphate (Menazon)
O,O-dimethyl-O-(3-chlor-4-nitrophenyl)thiophosphate (Chlorthion)
O,O-dimethyl-O(or S)-2-(ethylthioethyl)thiophosphate (Demeton-S-methyl)
2-(O,O-dimethyl-phosphoryl-thiomethyl)-5-methoxy-pyron-4-3,4-dichlorbenzyl-triphenylphosphonium-chloride
O,O-diethyl-S-(2,5-dichlorphenylthiomethyl)dithio-phosphate (Phenkapton)
O,O-diethyl-O-(4-methyl-cumarinyl-7-)-thiophosphate (Potasan)
5-amino-bis(dimethylamido)phosphinyl-3-phenyl-1,2,4-triazole (Triamiphos)
N-methyl-5-(O,O-dimethylthiolphosphoryl)-3-thiavaleramide (Vamidothion)
O,O-diethyl-O-[2-dimethylamino-4-methylpyrimidyl-(6)]-thiophosphate (Diocthyl)
O,O-dimethyl-S-(methylcarbamoylmethyl)-thiophos-phate (Omethoate)
O-ethyl-O-(8-quinolinyl)-phenylthiophosphonate (Oxinothiophos)
O-methyl-s-methyl-amidothiophosphate (Monitor)
O-methyl-O-(2,5-dichlor-4-bromphenyl)-benzothio-phosphate (Phosvel)
O,O,O,O-tetrapropyldithiophosphate
3-(dimethoxyphosphinyloxy)-N-methyl-N-methoxy-cis-crotonamide
O,O-dimethyl-S-(N-ethylcarbamoylmethyl)dithio-phosphate (Ethoate-methyl)
O,O-diethyl-S-(N-isopropylcarbamoylmethyl)-dithio-phosphate (Prothoate)
S-N-(1-cyano-1-methylethyl)carbamoylmethyldiethyl-thiolphosphate (Cyanthoate)
S-(2-acetamidoethyl)-O,O-dimethyldithiophosphate
Hexamethylphosphoric acid triamide (Hempa)
O,O-dimethyl-O-(2-chlor-4-nitrophenyl)thiophosphate (Dicapthon)
O,O-dimethyl-O-p-cyanophenyl thiophosphate (Cyanox)
O-ethyl-O-p-cyanophenylthiophosphonate
O,O-diethyl-O-2,4-dichlorphenylthiophosphate (Dichlorfenthion)
O,2,4-dichlorphenyl-O-methylisopropylamidothio-phosphate
O,O-diethyl-O,2,5-dichlor-4-bromphenylthiophosphate (Bromophos-ethyl)
Dimethyl-p-(methylthio)phenylphosphate
O,O-dimethyl-O-p-sulfamidophenylthiophosphate
O-[p-(p-chlorphenyl)azophenyl]O,O-dimethylthio-phosphate (Azothoate)
O-ethyl-S-4-chlorphenyl-ethyldithiophosphate
O-isobutyl-S-p-chlorphenyl-ethyldithiophosphate
O,O-dimethyl-S-p-chlorphenylthiophosphate
O,O-dimethyl-S-(p-chlorphenylthiomethyl)dithio-phosphate
O,O-diethyl-p-chlorphenylmercaptomethyl-dithio-phosphate (Carbophenothion)
O,O-diethyl-S-p-chlorphenylthiomethyl-thiophosphate
O,O-dimethyl-S-(carbethoxy-phenylmethyl)dithiophos-phate (Phenthoate)
O,O-diethyl-S-(carbofluorethoxy-phenylmethyl)-dithiophosphate
O,O-dimethyl-S-(carboisopropoxy-phenylmethyl)-dithiophosphate
O,O-diethyl-7-hydroxy-3,4-tetramethylene-coumarinyl-thiophosphate (Coumithoate)
2-methoxy-4-H-1,3,2-benzodioxaphosphorin-2-sulphide
O,O-diethyl-O-(5-phenyl-3-isooxazolyl)thiophosphate 2-(diethoxyphosphinylimino)-4-methyl-1,3-dithiolane
Tris-(2-methyl-1-aziridinyl)-phosphine oxide (METEPA)
S-(2-chlor-1-phthalimidoethyl)-O,O-diethyldithio-phosphate
N-hydroxynaphthalimido-diethylphosphate
Dimethyl-3,5,6-trichlor-2-pyridylphosphate
O,O-dimethyl-O-(3,5,6-trichlor-2-pyridyl)thiophosphate
S-2-(ethylsulphonyl)ethyl dimethylthiolphosphate (Dioxydemeton-S-methyl)
Diethyl-S-2-(ethylsulphinyl)ethyl dithiophosphate (Oxydisulfoton)
Bis-O,O-diethylthiophosphoric acid anhydride (Sulfotep)
Dimethyl-1,3-di(carbomethoxy)-1-propen-2-yl-phosphate
Dimethyl-(2,2,2-trichlor-1-butyroyloxyethyl)phosphate (Butonate)
O,O-dimethyl-O-(2,2-dichlor-1-methoxy-vinyl)phosphate
Bis-(dimethylamido)fluorphosphate (Dimefox)
3,4-dichlorbenzyl-triphenylphosphoniumchloride
Dimethyl-N-methoxymethylcarbamoylmethyl-dithio-phosphate (Formocarbam)
O,O-diethyl-O-(2,2-dichlor-1-chlorethoxyvinyl)phos-phate
O,O-dimethyl-O-(2,2-dichlor-1-chlorethoxyvinyl)phos-phate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorphenylthiomethyl)dithio-phosphate (Methylcarbophenothion)
O,O-dimethyl-S-(ethylthiomethyl)dithiophosphate
Diisopropylaminofluorphosphate (Mipafox)
O,O-dimethyl-S-(morpholinylcarbamoylmethyl)di-thiophosphate (Morphothion)
Bismethylamido-phenylphosphate
O,O-dimethyl-S-(benzene sulphonyl)dithiophosphate
O,O-dimethyl-(S and O)-ethylsulphinylethylthio-phosphate
O,O-diethyl-O-4-nitrophenylphosphate
Triethoxy-isopropoxy-bis(thiophosphinyl)disulphide
2-methoxy-4H-1,3,2-benzodioxaphosphorin-2-oxide
Octamethylpyrophosphoramide (Schradan)
Bis (dimethoxythiophosphinylsulphido)-phenylmethane
N,N,N',N'-tetramethyldiamidofluorphosphate (Dimefox)
O-phenyl-O-p-nitrophenyl-methanthiophosphonate (Colep)
O-methyl-O-(2-chlor-4-tert. butyl-phenyl)-N-methyl-amidothiophosphate (Narlene)
O-ethyl-O-(2,4-dichlorphenyl)-phenylthiophosphonate
O,O-diethyl-O-(4-methylmercapto-3,5-dimethylphenyl)-thiophosphate
4,4'-bis(O,O-dimethylthiophosphoryloxy)-diphenyl disulphide,
O,O-di(β-chlorethyl)-O-(3-chlor-4-methyl-coumarinyl-7)-phosphate
S-(1-phthalimidoethyl)-O,O-diethyldithiophosphate
O,O-dimethyl-O-(3-chlor-4-diethylsulphamylphenyl)-thiophosphate
O-methyl-O-(2-carbisopropoxyphenyl)-amidothio-phosphate
5-(O,O-dimethylphosphoryl)-6-chlor-bicyclo(3.2.0)-heptadiene (1,5)
O-methyl-O-(2-i-propoxycarbonyl-1-methylvinyl) ethylamido-thiophosphate.

CARBAMIC ACID DERIVATIVES 1-naphthyl-N-methylcarbamate (Carbaryl)
2-butinyl-4-chlorophenylcarbamate
4-dimethylamino-3-tolyl-N-methylcarbamate (Aminocarb)
4-methylthio-3,5-xylyl-N-methylcarbamate (Methiocarb)
2-chlorophenyl-N-methylcarbamate (CPMC)
1-(dimethylcarbamoyl)-5-methyl-3-pyrazolyl-N,N-dimethylcarbamate (Dimethilan)

2,3-dihydro-2,2-dimethyl-7-benzofuranyl-N-methylcarbamate (Carbofuran)
2-methyl-2-methylthiopropional-O-(methylcarbamoyl)-oxime (Aldicarb)
8-quinaldyl-N-methylcarbamate and salts thereof
3-isopropyl-5-methylphenyl-N-methylcarbamate (Promecarb)
2-(1,3-dioxolan-2-yl)-phenyl-N-methylcarbamate (Dioxocarb)
2-(4,5-dimethyl-1,3-dioxalan-2-yl)-phenyl-N-methylcarbamate
2-(1,3-dithiolan-2-yl)-phenyl-N-methylcarbamate
2-(1,3-dithiolan-2-yl)-phenyl-N,N-dimethylcarbamate
2-isopropoxyphenyl-N-methylcarbamate (Aprocarb)
4-diallylamino-3,5-xylyl-N-methylcarbamate (Allyxicarb)
1-isopropyl-3-methylpyrazol-5-yl-N,N-dimethyl-carbamate (Isolan)
1-methylthioethylimino-N-methylcarbamate (Methomyl)
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methyl-carbamate
3,5-dimethyl-4-[dipropargylamino]-phenyl-N-methyl-carbamate
2-[allylisopropylamino]-phenyl-N-methylcarbamate

NITROPHENOLS AND DERIVATIVES 4,6-dinitro-6-methylphenol, Na-salt [Dinitrocresol]
Dinitrobutylphenol-(2,2',2''-triethanolamine) salt
2-cyclohexyl-4,6-dinitrophenol [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Diniobuton]

MISCELLANEOUS

Pyrethin I
Pyrethin II
3-allyl-2-methyl-4-oxo-2-cyclopenten-1-yl-chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide [Chlorbensid]
6-methyl-2-oxol-3-dithiolo-[4,5-b]-quinoxaline [Quinomethionate]
(I)-3-(2-furfuryl)-2-methyl-4-oxocyclopent-2-enyl(I)-(cis+trans)-chrysanthemum-monocarboxylate [Furethrin]
2-pivaloyl-indane-1,3-dione [Pindon]
N'-(4-chloro-2-methylphenyl)-N,N-dimethylform-amidine (Chlorphenamidin)
4-chlorobenzyl-4-fluorophenyl-sulphide (Fluorbenside)
5,6-dichloro-1-phenoxycarbanyl-2-trifluoromethyl-benzimidazole (Fenozaflor)
p-Chlorophenyl-p-chlorobenzenesulphonate (Ovex)
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
p-Chlorobenzyl-p-chlorophenylsulphide (Chlorbenside)
2-Thio-1,3-dithiolo-(,5,6)-quinoxaline (Thiochinox)
Prop-2-ynyl-(4-t-butylphenoxy)-cyclohexylsulphite (Propargil).

The active substances of the Formula I also possess excellent fungicidal properties against phytopathogenic fungi in cultivated plants of the most diverse kinds, such as cereals, maize, rice, vegetables, ornamental plants, fruit varieties, grapevines, farm products etc.

Using the active substances of the invention it is possible to check or destroy fungus infections which have occurred on fruit, blossoms, leaves, stems, tubers and roots, and parts of plants which then grow later also remain free from such infections. The active substances of the Formula I are active against the phytopathogenic fungi belonging to the following classes, orders and species of fungi:

Oomycetes such as Plasmodiophora types, Aphanomyces types, Pythium types, Phytophthora types, e.g. (*Phytophthora infestans, Phytophthora cactorum*), Plasmopara types, e.g. (*Plasmopara viticola*), Bremia types (*Bremia lactucae*), Peronospora types, e.g. (*Peronospora tabacina*), Pseudoperonospora types, e.g. (*Pseudoperonospora humuli*).

Zygomycetes such as Rhizopus types.

Ascomycetes such as Eurotiales, such as Aspergillus types, Penicillium types, e.g. (*Penicillium digitatum, Penicillium italicum*), Taphrinales, such as Taphrina types, e.g. (*Taphrina deformans*), Erysiphales, such as Erysiphes types, e.g. (*Erysiphes cichoracearum, Erysiphes graminis*), Podosphaera leucotricha, Sphaerotheca types (*Sphaerotheca pannosa*), Uncinula types (*Uncinula necator*), Helotiales, such as Monilinia types (*Monilina [Sclerotina] fructicola; Monilina laxa*), Diplocarpon types (*Diplocarpon rosae*), Pseudopeziza types, Sphaerilaes, such as Nectria types (*Nectria galligena*), Ceratocystis types, Pseudosphaeriales, such as Venturia types (*Venturia inaequalis*), Mycosphaerella types, Ophiobolus types (*Ophiobolus graminis*), Cochlicobolus types (*Helminthosporium miyabeanus*), Cercospora types (*Cercospora beticola, Cercospora musae*).

Basidiomycetes, such as Ahpyllophorales, Pellicularia types, e.g. (*Pellicularia filamentora=[Rhizoctonia solani]*), Uredinales, such as Puccinia types, e.g. (*Puccinia triticina*), Uromyces types (*Uromyces phaseoli*), Hemileia types (*Hemileia vastatrix*), Cronartium types (*Cronartium ribicola*), Phragmidium types (*Phragmidium subcorticium*), Gymosporangium.

Denteromycetes=(Fungi Imperfecti) such as Piricularia types, e.g. (*Piricularia oryzac*), Corynespora types. Thielaviopsis types, Clasterosporium types, Botrytis types (*Botrytis cinerea*), Cladosporium types, Alternaria types (*Alternaria solani*), Verticillium types (*Verticillium alboatrum*), Phialophora types, Melanconiales, such as Colletotrichum types, Fusarium types such as (*Fusarium oxysporum, Fusarium nivale*), Gloesporium types (*Gleosporium fructigenum*), Sphaeropsidales, e.g. Septoria types (*Septoria apicola*), Diplodia types (*Diplodia natalensis*), Mycelia sterilia, e.g. Sclerotium types (*Sclerotium rolfsii*).

The active substances according to the invention can also be used for treating seed grain, fruit, tubers, etc. and for protecting them from fungus infections, for example from smut fungi of all kinds, such as: Ustilaginales, such as Ustilago types (*Ustilage avenae*); Tilletia types (*Tilletia tritici*); Urocystis and Tuburcinia types; Phoma types (*Phoma betae*).

To broaden their activity spectrum the active substances of the Formula I may contain in admixture bactericides, fungistatic agents, bacteriostatic agents, nematocides, and/or, for example, the following fungicides:

Dodecylguanidine acetate (Dodine)
Pentachloronitrobenzene (Quintozens)
Pentachlorophenol (PCP)
2-(1-methyl-n-propyl)-4,6-dinitrophenyl-2-methyl-crotonate (Binapacryl)
2-(1-methyl-n-heptyl)-4,6-dinitrophenylcrotonate (Dinocap)
2,6-dichlor-4-nitroaniline (Dichloran)
2,3,5,6-tetrachloro-benzoquinone (1,4) (Chloranil)
2,3-dichlor-naphthoquinone (1,4) (Dichlone)
N-(trichlormethylthio) phthalimide (Folpat)

N-(trichloromethylthio)cyclohex-4-en-1,2-dicarboximide (Captan)
N-(1,1,2,2-tetrachloroethylthio)cyclohex-4-en-1,2-dicarboximide (Captafol)
N-methansulfonal-N-trichlormethylthio-chloroaniline
N'-dichlorofluoromethylthio-N,N-dimethyl-N'-phenyl-sulfamide (Dichlofluanid)
O-ethyl-S-benzyl-phenyldithiophosphate
O,O-diethyl-S-benzyl-thiolphosphate
Disodium-ethylene-1,2-bis-dithiocarbamate (Nabam)
Zinc-ethylene-1,2-bis-dithiocarbamate (Zineb)
Manganese-ethylene-1,2-bis-dithiocarbamate (polymeric) (Maneb)
Tetramethylthiuramdisulfide (Thiram)
1-oxy-3-acetyl-6-methyl-cyclohexene-(5)dione-(2,4) Dehydroacetic acid)
8-hydroxyquinoline (8-quinolinol)
2-dimethylamino-6-methyl-5-n-butyl-4-hydroxy-parimidine
Methyl-N-benzimidazol-2-yl-N-(butylcarbamoyl) carbamate (Benomyl)
2-ethylamino-6-methyl-5-n-butyl-4-hydroxypyrimidine
2,3-dicyano-1,4-dithia-anthraquinone (Dithianon)
2-(4-thiazolyl)-benzimidazole
3,5-dimethyltetrahydro-1,3,5-thiadiazine-2-thione (Dazomet)
2,3-dihydro-5-carboxanilido-6-methyl-1,4-oxathine
Pentachlorobenzyl alcohol.

The compounds of the Formula I can be used as pure concentrate or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilizers.

For application, the compounds of the Formula I may be processed to dusts, emulsion concentrates, granules, dispersions, sprays, solutions or suspensions, in the conventional formulation generally known and employed in application technology. Mention may also be made of "cattle dips" and "spray races," in which aqueous preparations are used.

The agents according to the invention are manufactured in known manner by intimately mixing and/or grinding active substances of the Formula I with the suitable carriers, optionally with the addition of dispersants or solvents which are inert towards the active substances. The active substances may be available and can be used in the following forms:

Solid forms: dusts, tracking agents, granules, coated granules, impregnated granules and homogeneous granules.

Liquid forms: (a) active substances which are dispersible in water: wettable powders, pastes, emulsions; (b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminium silicates (feldspar and mica), calcium and magnesium sulphates, magnesium oxide, ground synthetic materials, fertilizers, for example ammonium sulphate, ammonium phosphate, ammonium nitrate, urea, ground vegetable products, such as corn meal, bark dust, sawdust, nutshell meal, cellulose powder, residues of plant extractions activated charcoal etc. These substances can either be used alone or in admixture with one another.

Granules can be very easily manufactured by dissolving an active substance of the Formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the Formula I with polymerizable compounds (urea/formaldehyde; dicyandiamide/formaldehyde; melamine/formaldehyde or others), whereupon a mild polymerization is carried out that does not affect the active substances and in the process of which the granulation is carried out during the gel formation. It is more advantageous to impregnate finished, porous polymer granules (urea/formaldehyde, polyacrylonitrile, polyesters or others) which have a specific surface area and a favorable predeterminable adsorption/desorption ratio, with the active substances, for example in the form of their solutions (in a low boiling solvent) and to remove the solvent. Polymer granules of this kind in the form of microgranules having a bulk density of 300 g./liter to 600 g./liter can also be manufactured with the aid of atomizers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilize the active substance and/or non-ionic, anionic and cationic surface active substances, which for example improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulfonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, poyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilize the active substance, surface-active substances and anti-foam agents and, optionally, solvents.

Wettable powders and pastes are obtained by mixing and grinding the active substances with dispersing agents and pulverulent carriers in suitable apparatus until homogeneity is attained. Carriers are, for example, those mentioned for the solid forms of application. In some cases it is advantageous to use mixtures of different carriers. As dispersing agents there can be used, for example, condensation products of sulfonated naphthalene and sulfonated naphthalene derivatives with formaldehyde, condensation products of naphthalene or naphthalene sulfonic acids with phenol and fomaldehyde, as well as alkali, ammonium and alkaline earth metal salts of lignin sulfonic acid, in addition, alkylaryl sulfonates, alkali and alkaline earth metal salts of dibutyl naphthalene sulfonic acid, fatty alcohol sulfates such as salts of sulfated hexadecanols, heptadecanols, octadecanols, and salts of sulfated fatty alcohol glycol ethers, the sodium salt of oleoyl ethionate, the sodium salt of oleoyl methyl tauride, ditertiary acetylene glycols, dialkyl dilauryl ammonium chloride and fatty acid alkali and alkaline earth metal salts.

Suitable anti-foam agents are silicones.

The active substances are so mixed, ground, sieved and strained with the additives mentioned above that, in wettable powders, the solid particle size of from 0.02 to 0.04 and in pastes, of 0.03 is not exceeded. To produce emulsifiable concentrates and pastes, dispersing agents such as those cited above, organic solvents and water are used. Examples of suitable solvents are the following: alcohols, benzene, xylenes, toluene, dimethyl sulfoxide, and mineral oil fractions boiling between 120 and 350° C. The solvents must be practically odorless, not phytotoxic, inert to the active substances and not readily inflammable.

Furthermore, the agents according to the invention can be applied in the form of solutions. For this purpose the active substance or several active substances of the general Formula I are dissolved in suitable organic solvents, mixtures of solvents or in water. Aliphatic and aromatic hydrocarbons, chlorinated derivatives thereof, alkyl naphthalenes, and mineral oils alone or mixed with each other, can be used as organic solvents.

The content of active substance in the above described agents is between 0.1% to 95%, in which connection it should be mentioned that in the case of application from aircraft or some other suitable means of application, it is possible to use concentrations of up to 99.5% or even pure active substance.

The active substances of the Formula I can, for example, be formulated as follows:

DUSTS

The following substances are used to manufacture (a) a 5% and (b) a 2% dust:

(a)

| | Parts |
|---|---|
| Active substance | 5 |
| Talcum | 95 |

(b)

| | Parts |
|---|---|
| Active substance | 2 |
| Highly disperse silica | 1 |
| Talcum | 97 |

The active substances are mixed with the carriers and ground.

GRANULES

The following substances are used to produce 5% granules:

| | Parts |
|---|---|
| Active substance | 5 |
| Epichlorhydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

WETTABLE POWDER

The following constituents are used for the preparation of (a) a 40%, (b) and (c) a 25%, and (d) a 10% wettable powder:

(a)

| | Parts |
|---|---|
| Active substance | 40 |
| Sodium lignin sulphonate | 5 |
| Sodium dibutyl-naphthalene sulphonate | 1 |
| Silicic acid | 54 |

(b)

| | Parts |
|---|---|
| Active substance | 25 |
| Calcium lignin sulphonate | 4.5 |
| Champagne chalk/hydroxyethyl cellulose mixture (1:1) | 1.9 |
| Sodium dibuytl naphthalene sulphonate | 1.5 |
| Silicic acid | 19.5 |
| Champagne chalk | 19.5 |
| Kaolin | 28.1 |

(c)

| | Parts |
|---|---|
| Active substance | 25 |
| Isooctylphenoxy-polyoxyethylene-ethanol | 2.5 |
| Champagne chalk/hydroxyethyl cellulose mixture (1:1) | 1.7 |
| Sodium aluminium silicate | 8.3 |
| Kieselguhr | 16.5 |
| Kaolin | 46 |

(d)

| | Parts |
|---|---|
| Active substance | 10 |
| Mixture of the sodium salts of saturated fatty alcohol sulphates | 3 |
| Naphthalene sulphonic acid/formaldehyde condensate | 5 |
| Kaolin | 82 |

The active substances are intimately mixed, in suitable mixers, with the additives, the mixture being then ground in the appropriate mills and rollers. Wettable powders are obtained which can be diluted with water to give suspensions of any desired concentration.

EMULSIFIABLE CONCENTRATES

The following substances are used to produce (a) a 10% and (b) a 25% emulsifiable concentrate:

(a)

| | Parts |
|---|---|
| Active substance | 10 |
| Epoxidized vegetable oil | 3.4 |
| Combination emulsifier consisting of fatty alcohol polyglycol ether and alkylarylsulphonate calcium salt | 13.4 |
| Dimethylformamide | 40 |
| Xylene | 43.2 |

(b)

| | Parts |
|---|---|
| Active substance | 25 |
| Epoxidized vegetable oil | 2.5 |
| Alkylarylsulphonate/fatty alcohol polyglycol ether mixture | 10 |
| Dimethylformamide | 5 |
| Xylene | 57.5 |

From these concentrates it is possible to produce, by dilution with water, emulsions of any desired concentration.

SPRAY

The following constituents are used to prepare a 5% spray:

| | Parts |
|---|---|
| Active substance | 5 |
| Epichlorhydrin | 1 |
| Benzine (boiling limits 160°–190° C.) | 94 |

EXAMPLE 1

(a) 17.9 grams of 1 - phenyl - 3-hydroxy-1,2,4-triazole-5-carboxylic acid ethyl ester and 10.6 g. of potassium carbonate are heated under reflux in 500 ml. of methyl ethyl ketone. Upon cessation of the splitting off of $CO_2$, the solution is cooled to room temperature and treated with a solution of 14.5 g. of diethylthiophosphoric chloride in 100 ml. of methyl ethyl ketone. The reaction mixture is then refluxed for 1 hour and subsequently stirred for 12 hours at room temperature. The solution is filtered, the filtrate evaporated in vacuo and the residue dissolved in methanol. The methanolic solution is cooled with acetone/$CO_2$ to yield O - [1 - phenyl - 5 - ethoxycarbonyl-1,2,4-triazolyl(3)]-O,O-diethyl-thiophosphate (active substance No. 1). Melting point: 54–55° C.

(b) 17.8 grams of 1 - phenyl - 3-hydroxy-1,2,4-triazole-5-carboxylic acid ethyl ester are refluxed for 1 hour with 10 g. of potassium carbonate in 200 ml. of methyl ethyl ketone. Upon cooling, there is added to this solution dropwise and with stirring a solution of 15 g. of O-ethyl-ethyl-thiophosphonic chloride in 50 ml. of methyl ethyl ketone. The reaction mixture is then refluxed for 30 minutes, stirred thereafter for 12 hours at room temperature, and filtered. The solvent is distilled off and the residue chromatographed over the 20 fold amount of silica gel (0.05–0.2 mm.) with acetone to yield O-[1-phenyl-5-ethoxycarbonyl - 1,2,4 - triazolyl(3)]-O-ethyl-ethyl-thiophosphonate (active substance No. 2), $n_D^{20}$: 1.5394. The following compounds were also manufactured in analogous manner:

| No. | | Physical data |
|---|---|---|
| 3 | O-[1-phenyl-5-N-methylcarbamoyl-1,2-4-triazolyl-(3)]-O,O-diethyl-thiophosphate. | M.P.: 90–91° C. |
| 4 | O-[1-phenyl-5-carbamoy-1,2,4-triazolyl-(3)]-O,O-diethyl-thiophosphate. | M.P.: 54–56° C. |
| 5 | O-[1-phenyl-5-N-methylcarbamoyl-1,2-4-triazolyl-(3)]-O-ethyl-ethylthiophosphonate. | M.P.: 88–90° C. |
| 6 | O-[1-phenyl-5-N,N-dimethylcarbamoyl-1,2,4-triazolyl-(3)]-O,O-diethyl-thiophosphate. | M.P.: 52–53° C. |
| 7 | O-[1-phenyl-5-N,N-dimethylcarbamoyl-1,2,4-triazolyl-(3)]-O-ethyl-ethylthiophosphonate. | $n_D=1.5495$. |
| 8 | O-[1-isopropyl-5-ethoxycarbonyl-1,2,4-triazolyl-(3)]-O,O-diethyl-thiophosphate. | $n_D=1.4834$. |
| 9 | O-[1-phenyl-5-ethoxycarbonyl-1,2,4-triazolyl-(3)]-O,O-dimethyl-thiophosphate. | $n_D=1.5462$. |
| 10 | O-[1-phenyl-5-ethoxycarbonyl-1,2,4-triazolyl-(3)]-O,O-dimethyl-phosphate. | $n_D=1.5215$. |
| 11 | O-[1-phenyl-5-ethoxycarbonyl-1,2,4-triazolyl-(3)]-O,O-diethyl-phosphate. | $n_D=1.5085$. |
| 12 | O-[1-3'(-chlorophenyl)-5-ethoxycarbonyl-1,2,4-triazolyl-(3)]-O,O-diethyl-thiophosphate. | $n_D=1.5412$. |
| 13 | O-[1,isopropyl-5-ethoxycarbonyl-1,2,4-triazolyl-(3)]-O-ethyl-ethylthiophosphonate. | $n_D=1.4927$. |
| 14 | O-[1-phenyl-5-N,N-dimethylcarbamoyl-1,2,4-triazolyl-(3)]-O,O-dimethyl-thiophosphate. | M.P.: 58–62° C. |
| 15 | O-[1-phenyl-5-methoxycarbonyl-1,2,4-triazolyl-(3)]-O,O-diethyl-thiophosphate. | M.P.: 58–61° C. |
| 16 | O-[1-phenyl-5-ethoxycarbonyl-1,2,4-triazolyl-(3)]-O-n-propyl-methyl-thiophosphate. | $n_D=1.5340$. |

EXAMPLE 2

Insecticidal ingest poison test

Tobacco and potato plants are sprayed with a 0.05% aqueous active substance emulsion (obtained from a 10% emulsifiable concentrate). After the coating has dried, Egyptian cotton leaf worms (*Sporoptera literalis*) are settled on the tobacco plants and Colorado potato beetles (*Leptinotarsa decemlineta*) on the potato plants. The test is carried out at 24° C. and 60% relative humidity.

In the following Tables 1 and 2 the time is indicated in hours after which 100% of the animals are in the dorsal position.

TABLE 1

| Active substance | 100% of animals in the dorsal position, after X hours— Colorado potato beetles |
|---|---|
| O-[1-phenyl-5-ethoxycarbonyl-1,2,4-triazolyl-(3)]-O,O-diethyl-thiophosphate | 1 |
| O-[1-phenyl-5-carbamoyl-1,2,4-triazolyl-(3)]-O,O-diethyl-thiophosphate | 2 |
| O-[1-phenyl-5-ethoxycarbonyl-1,2,4-triazolyl-(3)]-O-ethyl-ethylthiophosphonate | 1 |
| O-[1-phenyl-5-N-methylcarbamoyl-1,2,4-triazolyl-(3)]-O-ethyl-ethylthiophosphonate | 2 |
| O-[1-phenyl-5-N,N-dimethylcarbamoyl-1,2,4-triazolyl-(3)]-O-ethyl-ethylthiophosphonate | 1 |
| O-[1-phenyl-5-ethoxycarbonyl-1,2,4-triazolyl-(3)]-O,O-dimethyl-thiophosphate | 1 |
| O-[1-phenyl-5-ethoxycarbonyl-1,2,4-triazolyl-(3)]-O,O-dimethyl-phosphate | 1 |
| O-[1-phenyl-5-ethoxycarbonyl-1,2,4-triazolyl-(3)]-O,O-diethyl-phosphate | 2 |
| O-[1-(3'-chlorophenyl)-5-ethoxycarbonyl-1,2,4-triazolyl-(3)]-O,O-diethyl-thiophosphate | 1 |
| O-[1-isopropyl-5-ethoxycarbonyl-1,2,4-triazolyl-(3)]-O-ethyl-ethylthiophosphonate | 2 |
| O,O-diethyl-O-[2-isopropyl-6-methyl-pyrimidinyl-(4)]-thiophosphate (Diazinon) | 24 |

TABLE 2

| Active substance | 100% of animals in the dorsal position, after X hours— Egyptian cotton leaf worms |
|---|---|
| O-[1-phenyl-5-ethoxycarbonyl-1,2,4-triazolyl-(3)]-O,O-diethyl-thiophosphate | 24 |
| O-[1-phenyl-5-N-methylcarbamoyl-1,2,4-triazolyl-(3)]-O,O-diethyl-thiophosphate | 24 |
| O-[1-phenyl-5-ethoxycarbonyl-1,2,4-triazolyl-(3)]-O-ethyl-ethylthiophosphonate | 24 |
| O-[1-phenyl-5-N,N-dimethylcarbamoyl-1,2,4-triazolyl-(3)]-O,O-diethyl-thiophosphate | 24 |
| O-[1-isopropyl-5-ethoxycarbonyl-1,2,4-triazolyl-(3)]-O,O-diethyl-thiophosphate | 5 |
| O-[1-phenyl-5-ethoxycarbonyl-2,2,4-triazolyl-(3)]-O,O-dimethyl-thiophosphate | 24 |
| O-[1-isopropyl-5-ethoxycarbonyl-1,2,4-triazolyl-(3)]-O-ethyl-ethylthiophosphonate | 5 |
| O-[3-N-methylcarbamolyl-propenyl-(2)]-O,O-dimethylphosphoric ester (Azodrin) | 48 |

EXAMPLE 3

Systemic insecticidal action

To determine the systemic action, rooted bean plants (*Vicia fabae*) are put into a 0.01% aqueous active substance solution (obtained from a 10% emulsifiable concentrate). After 24 hours, aphids (*Aphis fabae*) are placed on the parts of the plant above the soil. The aphids are protected from contact and gas action by means of a special device. The test is carried out at 24° C. and 70% relative humidity.

The following Table 3 indicates the percentages of the animals that have fallen off after 24 hours.

TABLE 3

| Active substance | X% of animals that have fallen, after 24 hours— aphids |
|---|---|
| O-[1-phenyl-5-ethoxycarbonyl-1,2,4-triazolyl-(3)]-O,O-diethyl-thiophosphate | 80 |
| O-[1-phenyl-5-N-methylcarbamoyl-1,2,4-triazolyl-(3)]-O,O-diethyl-thiophosphate | 80 |
| O-[1-phenyl-5-carbamoyl-1,2,4-triazolyl-(3)]-O,O-diethyl-thiophosphate | 100 |
| O-[1-phenyl-5-ethoxycarbonyl-1,2,4-triazolyl-(3)]-O-ethyl-ethylthiophosphonate | 100 |
| O-[1-phenyl-5-N-methylcarbamoyl-1,2,4-triazolyl-(3)]-O-ethyl-ethylthiophosphonate | 100 |
| O-[1-phenyl-5-N,N-dimethylcarbamoyl-1,2,4-triazolyl-(3)]-O,O-diethyl-thiophosphate | 90 |
| O-[1-phenyl-5-N,N-dimethylcarbamoyl-1,2,4-triazolyl-(3)]-O-ethyl-ethylthiophosphonate | 100 |
| O-[1-isopropyl-5-ethoxycarbonyl-1,2,4-triazolyl-(3)]-O,O-diethyl-thiophosphate | 100 |
| O-[1-phenyl-5-ethoxycarbonyl-1,2,4-triazolyl-(3)]-O,O-dimethyl-phosphate | 90 |
| O-[1-phenyl-5-ethoxycarbonyl-1,2,4-triazolyl-(3)]-O,O-diethyl-phosphate | 100 |
| O-[1-isopropyl-5-ethoxycarbonyl-1,2,4-triazolyl-(3)]-O-ethyl-ethylthiophosphonate | 100 |
| O-[1-phenyl-5-N,N-dimethylcarbamoyl-1,2,4-triazolyl-(3)]-O,O-dimethyl-thiophosphate | 100 |
| O-[1-phenyl-5-methoxycarbonyl-1,2,4-triazolyl-(3)]-O,O-diethyl-thiophosphate | 100 |
| O,O-diethyl-O-[1-phenyl-1,2,4-triazolyl-(3)]-thiophosphate (known from German Auslegeschrift 1,299,924) | 0 |

EXAMPLE 4

(a) Action against spider mites (*Tetranychus urticae*) and their stages

To test the acaricidal action, bean leaves which have been attacked by adults, latent stages and eggs of the red spider mite (*Tetranychus urticae*) are treated with a 0.05% aqueous emulsion of the substance to be tested (prepared from a 25% emulsifiable concentrate). The test is evaluated after 6 days. Strains of the red spider mite which are resistant to phosphoric esters are used as test subjects.

In the following Table 4 the mortality in percent is indicated after 6 days.

TABLE 4

| Active substance | Mortality in percent after 6 days with active substance concentrations of 0.05% | | |
|---|---|---|---|
| | Adults | Latent stages | Eggs |
| O-[1-phenyl-5-carbamoyl-1,2,4-triazolyl-(3)]-O,O-diethyl-thiophosphate | 100 | 100 | 100 |
| O-[1-phenyl-5-ethoxycarbonyl-1,2,4-triazolyl-(3)]-O-ethyl-ethylthiophosphonate | 100 | 100 | 100 |
| O-[1-phenyl-5-N-methylcarbamoyl-1,2,4-triazolyl-(3)-O-ethyl-ethylthiophosphonate | 100 | 100 | 100 |

(b) Action on ticks (*Boophilus microplus*) and their development stages

For the following test 10 adult ovipositing ticks are each dipped for 3 minutes in aqueous active substance emulsions (concentrations: see column 2). The composition of the emulsion can be found among the following preparation forms. The ticks are then kept at 27° C. and 80% relative humidity. The oviposition is determined on the 5th, 10th and 15th day.

TABLE 5

| Active substance | Active substance concentration in percent | Percent oviposition after— | | |
|---|---|---|---|---|
| | | 5 days | 10 days | 15 days |
| O-[1-phenyl-5-N,N-di-methylcarbamoyl-1,2,4-triazolyl-(3)]-O,O-di-ethylthiophosphate. | 0.1 | 0 | 0 | 0 |
| | 0.05 | 0 | 0 | 0 |
| | 0.05 | 0 | 0 | 0 |
| | 0.025 | 0 | 0 | 0 |

EXAMPLE 5

Action against soil nemotodes

To test the action against soil nematodes, the active substance (in a concentration of 50 p.p.m.) is applied to and intimately mixed with soil infected with root gall nematodes (*Meloidgyne avenaria*). Immediately afterwards, tomato cuttings are planted in the thus prepared soil in a series of tests and after waiting time of 8 days tomato seeds are sown in another test series.

In order to assess the nematocidal action, the galls present on the roots are counted 28 days after planting and sowing respectively. The compounds according to Example 1 display a nematocidal action in the above test.

EXAMPLE 6

Fungicidal action (a) Action against *Piricularia oryzae* Bri. et Cav.— Protective action: Rice plants are reared in a greenhouse and sprayed once with an aqueous spray broth containing 0.05% of active substance. Two days later the thus treated plants are infected with conidia of *Piricularia oryzae* Bri. et Cav. and examined for attack by fungus after an incubation period of 5 days in a humid chamber.

Curative action: Rice plants which are infected with conidia of *Piricularia oryzae* Bri. et Cav. are reared in a greenhouse. Two days after the infection the plants are sprayed with an aqueous spray broth containing 0.05% of active substance. They are examined for attack by fungus after a 5 day incubation period in a humid chamber.

(b) Action against *Phytophthora infestans* on *Solanum lycopersicum*.—*S. lycopersicum* plants of the same variety and in the same development stage were treated with a broth of 0.05% active substance (prepared from the active substance formulated as a wettable powder). After the spray broth coating had dried, the dry plants were sprayed dripping wet with a zoospore suspension of *Ph. infestans*. They were then kept for 10 days in a greenhouse at 18–20° C. and high humidity (95–100%). After this time they displayed typical leaf specks, on the number and size of which the tested substance was evaluated.

The compounds according to Example 1 displayed good fungicidal action in the above tests (a) and (b).

What is claimed is:

1. A compound of the formula

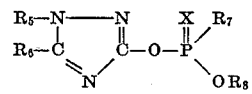

wherein $R_5$ represents $C_1$-$C_4$ alkyl, phenyl or chlorophenyl, $R_6$ represents the groups —$COOCH_3$,

—$COOC_2H_5$,

—$CONH_2$, —$CONHCH_3$ or —$CON(CH_3)_2$, $R_7$ represents methyl, ethyl, methoxy or ethoxy, $R_8$ represents methyl, ethyl or n-propyl, and X represents oxygen or sulphur.

2. A compound according to claim 1 which is O-[1-phenyl - 5 - ethoxycarbonyl-1,2,4-triazolyl(3)]-O-ethyl-ethylthiophosphonate.

3. A compound according to claim 2 of the formula

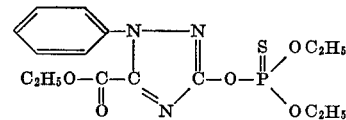

4. A compound according to claim 2 of the formula

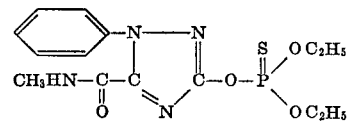

5. A compound according to claim 2 of the formula

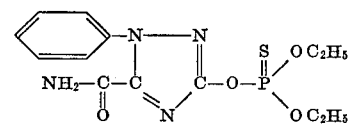

6. A compound according to claim 2 of the formula

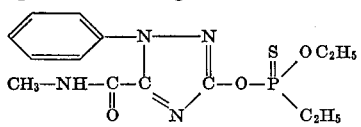

7. A compound according to claim 2 of the formula

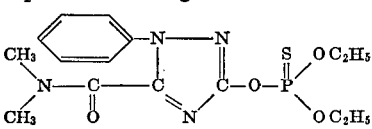

8. A compound according to claim 2 of the formula

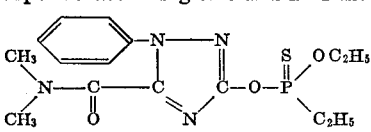

9. A compound according to claim 2 of the formula

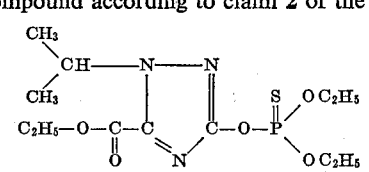

10. A compound according to claim 2 of the formula

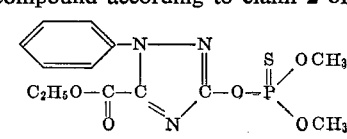

11. A compound according to claim 2 of the formula

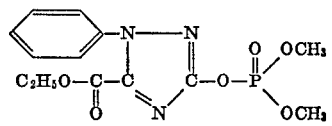

12. A compound according to claim 2 of the formula

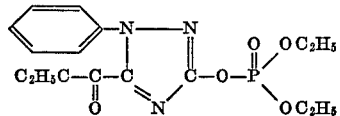

13. A compound according to claim 2 of the formula

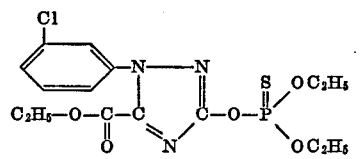

14. A compound according to claim 2 of the formula

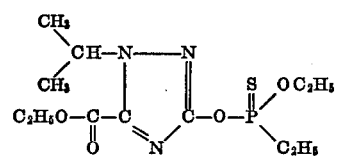

15. A compound according to claim 2 of the formula

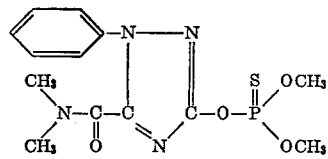

16. A compound according to claim 2 of the formula

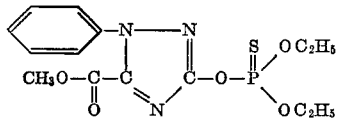

17. A compound according to claim 2 of the formula

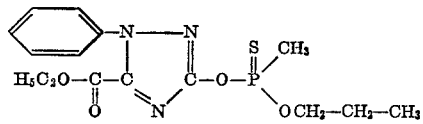

References Cited
UNITED STATES PATENTS
3,686,200   8/1972   Scherer et al. _____ 260—308 R JOSEPH A. NARCAVAGE, Primary Examiner U.S. Cl. X.R.

71—86, 87; 424—200

UNITED STATES PATENT OFFICE
CERTIFICATE OF CORRECTION

Patent No. 3,809,701          Dated May 7, 1974

Inventor(s) Dag Dawes and Beat Boehner

It is certified that error appears in the above-identified patent and that said Letters Patent are hereby corrected as shown below:

Column 17, Claim 12, in the formula, change "$C_2H_5C$" to
-- $C_2H_5O$ --.

Claims 3 through 17, in each first line, change "Claim 2" to
-- Claim 1 --.

Signed and sealed this 15th day of April 1975.

(SEAL)
Attest:

RUTH C. MASON
Attesting Officer

C. MARSHALL DANN
Commissioner of Patents
and Trademarks